(12) United States Patent
Misceo

(10) Patent No.: US 6,321,639 B1
(45) Date of Patent: Nov. 27, 2001

(54) MACHINE FOR MAKING ICE CREAM CONES AND OTHER FOOD PRODUCTS SUCH AS PANNINI

(76) Inventor: Vincenzo Misceo, 3083 Plymouth Drive, North Vancouver, British Columbia (CA)

( * ) Notice: Subject to any disclaimer, the term of this patent is extended or adjusted under 35 U.S.C. 154(b) by 0 days.

(21) Appl. No.: 09/644,849

(22) Filed: Aug. 24, 2000

(51) Int. Cl.[7] .............................. A47J 37/00; A47J 37/08; H05B 3/06
(52) U.S. Cl. ............................. 99/332; 99/331; 99/337; 99/344; 99/372; 99/374; 99/377; 99/378; 99/380; 99/389
(58) Field of Search .............................. 99/331–334, 337, 99/338, 342–344, 352, 372–380, 422, 447, 423, 426, 427, 385–391; 219/521, 524, 525, 536, 537; 426/523

(56) References Cited

U.S. PATENT DOCUMENTS

| | | |
|---|---|---|
| 1,498,654 | 6/1924 | Hauptman . |
| 2,478,529 | 8/1949 | Farr et al. . |
| 2,765,727 | 10/1956 | Lipisch et al. . |
| 3,236,998 | 2/1966 | Wertheimer et al. . |
| 3,245,337 | 4/1966 | White et al. . |
| 3,377,942 | 4/1968 | Carbon . |
| 3,788,302 | 1/1974 | Malaney et al. . |
| 3,799,047 | 3/1974 | Freeman . |
| 3,999,473 | 12/1976 | Carbon . |
| 4,531,048 | 7/1985 | Carbon . |
| 4,627,335 | 12/1986 | Sherman et al. . |
| 4,682,012 | 7/1987 | Wolf et al. . |
| 4,817,510 | 4/1989 | Kowalics et al. . |
| 4,913,038 | 4/1990 | Burkett et al. . |
| 5,636,564 | 6/1997 | Weiss et al. . |
| 5,755,150 | 5/1998 | Matsumoto et al. . |
| 5,927,184 | 7/1999 | Hermansson . |
| 6,044,755 * | 4/2000 | Misceo ................................... 99/332 |

* cited by examiner

Primary Examiner—Timothy F. Simone
(74) Attorney, Agent, or Firm—Oyen Wiggs Green & Mutala (57) ABSTRACT

Prior ice cream cone baking machines were manually raised and lowered, causing the cone to be sometimes overcooked or burnt. The present invention automatically raises the upper cooking plate after a pre-set cooking time, and maintains the baked cake at a warm temperature until removed from the lower cooking plate.

20 Claims, 10 Drawing Sheets

MACHINE FOR MAKING ICE CREAM CONES AND OTHER FOOD PRODUCTS SUCH AS PANNINI

TECHNICAL FIELD

The invention relates to the field of machines for making ice cream cones and other food products, and more particularly a machine for automatically baking waffle cones and pannini sandwiches.

BACKGROUND ART

Many ice cream stores feature ice cream cones having baked cones, called waffle cones, freshly baked on the premises for serving their scoops of ice cream, instead of, or in addition to, the usual pre-baked, mass-produced cones. By baking such cones on the premises, customers are attracted not only by the improved taste and texture of the waffle cones but also by the aroma created by the baking process. Such waffle cones are baked from a batter which is thicker and more cookie-like than that used for breakfast-type waffles, and are cooked thinner than breakfast waffles, so that they are malleable to form a cone when hot and harden when cool. Such waffle cones are baked on-site using manual waffle cone griddles also called pizelle irons which are generally round. Typically these will consist of a pair of heated griddle plates, each having a fixed lower heated griddle plate and a pivoting heated upper griddle plate which can be manually pivoted by an attached handle into, or out of, position above the fixed griddle plate. A timer may also be provided for signalling by a bell or buzzer when a chosen baking time has elapsed. The ice cream store employee opens one or both of the pre-heated griddles, pours the desired amount of batter onto the lower fixed griddle plate to form a circular cake or cookie, closes the upper pivoting griddle plate onto the lower griddle plate and starts the timer. When the desired baking time has elapsed the timer emits a signal, and the employee raises the upper griddle and removes the hot, baked cake from the lower griddle. The hot, thin cake, which is flexible when hot, is then wrapped around a cone-shaped form to form a cone, removed from the form and placed in a holder to cool and harden.

A problem with this existing method of baking waffle cones is that it requires constant attention from the employee/attendant. Often the same employee who is charged with baking cones also must serve ice cream to customers. If the employee is busy when the timer on the waffle griddle signals that the cake is cooked, then the cake may be over-cooked or burned.

Baking machines for baking breakfast-type waffles are known which automatically eject the waffle when cooked. For example, U.S. Pat. No. 3,799,047 issued Mar. 26, 1974 to Freeman discloses an apparatus to bake breakfast-type waffles in which a timer is provided for timing a baking period, at the end of which a servo-motor is activated to release a spring-driven lever to raise the upper griddle plate and lift the waffles off the lower plate. Such an arrangement would be unsuitable for waffle cones in that the waffle would quickly cool and harden in the raised position before the attendant could form the waffle into a cone.

Also, many restaurants provide pannini grills for baking pannini sandwiches. These are manual grills which require the attendant to manually lower the top cooking element onto the sandwich and raise it when the cooking is complete. Consequently sandwiches are often burned or overcooked.

There is therefore a need for an ice cream cone baking machine or pannini sandwich grill which automatically terminates the baking procedure when the cake is sufficiently cooked without allowing the cake to either cool or overcook.

DISCLOSURE OF INVENTION

The present invention provides an apparatus for baking food items such as waffle cones or sandwiches, comprising a) a lower cooking plate provided with a first electric heating element; b) an upper cooking plate provided with a second electric heating element and pivotable between a first open position spaced from the lower cooking plate and a second closed position parallel to and in contact or near contact with the lower cooking plate; c) motor means for pivoting the upper cooking plate between the first and second positions; d) first switch means for activating the motor means to lower the upper cooking plate to the second position; e) timing means for activating the motor means to raise the upper cooking plate to the first position after a pre-determined period of time; and f) temperature control means for sensing the temperature of the lower cooking plate and providing electric power from a supply of electric power to the first and second heating elements when the lower cooking plate is below a predetermined temperature and ceasing to provide electric power when the lower cooking plate is above a predetermined temperature.

BRIEF DESCRIPTION OF DRAWINGS

In drawings illustrating a preferred embodiment of the invention.

BEST MODE(S) FOR CARRYING OUT THE INVENTION

With reference to FIGS. 1 through 7, a waffle cone baking machine according to the invention, which is the subject of U.S. Pat. No. 6,044,755 which issued from the application from which this application claims priority, is designated by reference numeral 10. It comprises left and right griddle assemblies 16, 18 mounted between left and right housings 12, 14. Left and right griddle assemblies 16, 18 each comprise top cooking plates 34, 36 and bottom cooking plates 38, 40 respectively. Each cooking plate is TEFLON™ coated cast iron provided with top and bottom electric heating elements 41, 42 (FIG. 6) consisting of heating coils (not shown), and has a shallow upstanding rim 44 to retain batter, and shallow cross-hatched grooves 46 to provide the cone's surface pattern. Each housing 12, 14 has a griddle on/off switch 20, on/off indicating light 22, timer knob 24, top cooking plate close button 26 and indicator light 27 and top cooking plate manual open button 28 and indicator light 29. Right and left housings 12, 14 are joined by cross-bars 30,31, 32 secure at the lower front and upper and lower rear corners of the housings.

Figure 1:
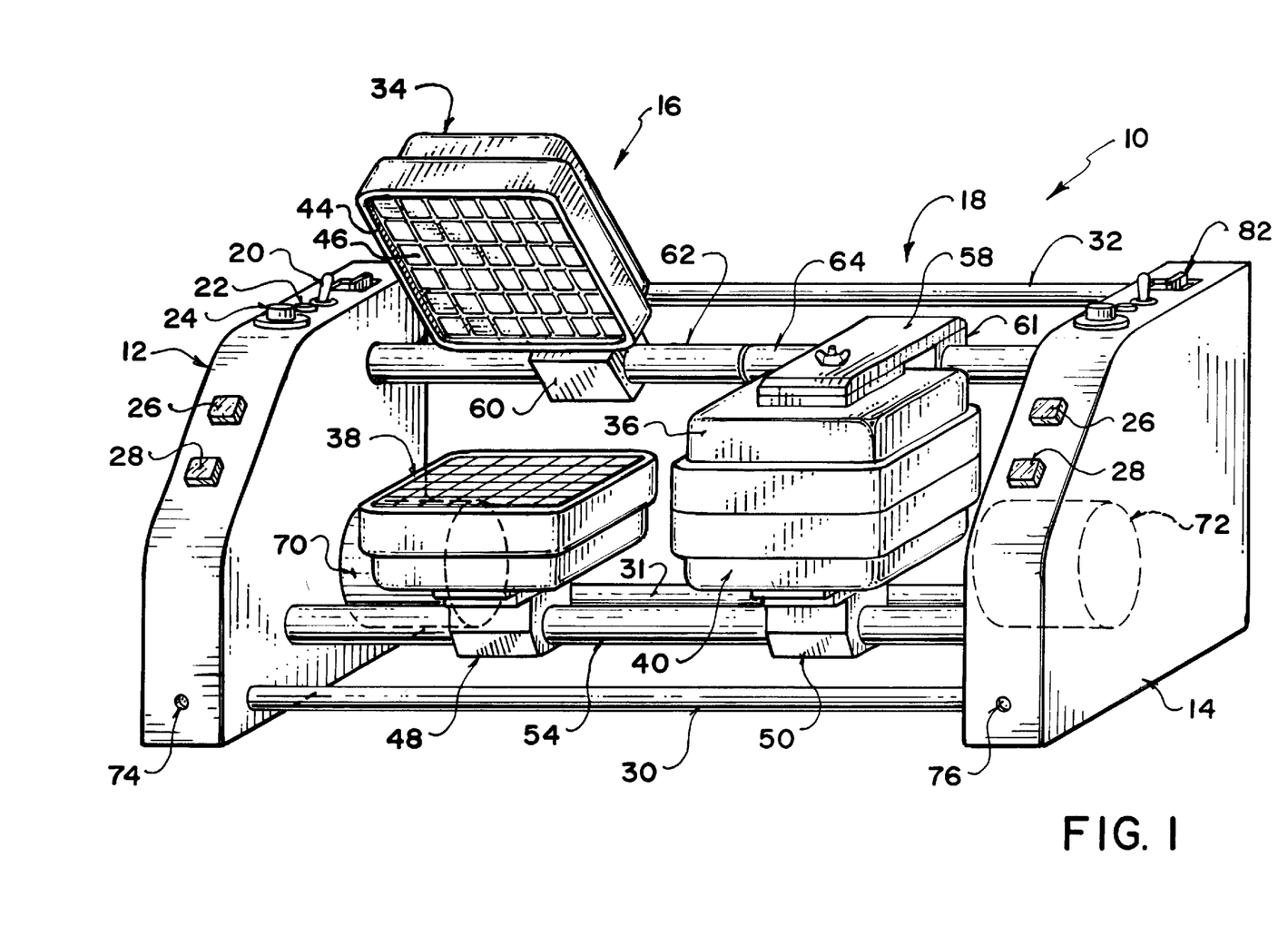
FIG. 1 is a perspective view of the invention, with one griddle in the open position and one in the closed cooking position.
Figure 2:
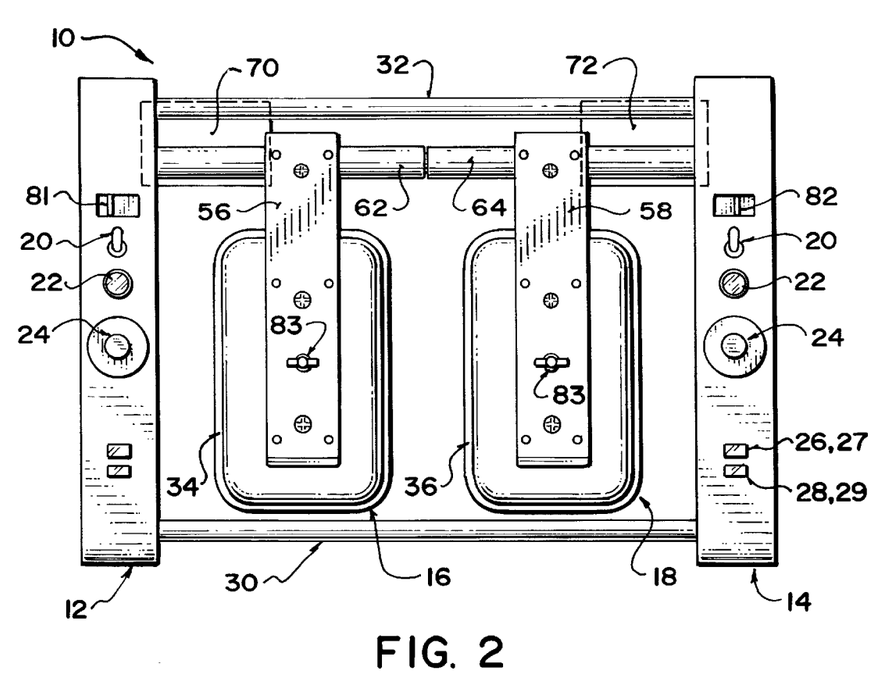
FIG. 2 is top view of the invention with both griddles in the closed position.
Figure 3:
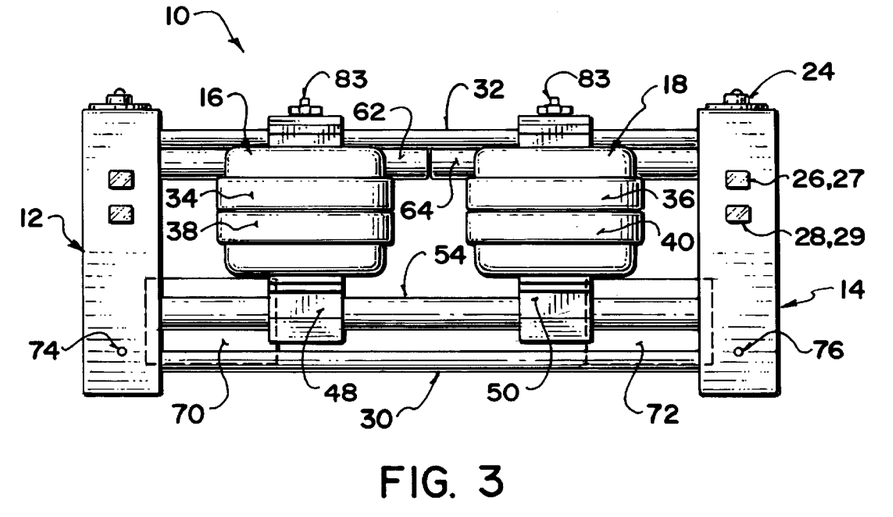
FIG. 3 is front view of the invention with both griddles in the closed position.
Figure 4:
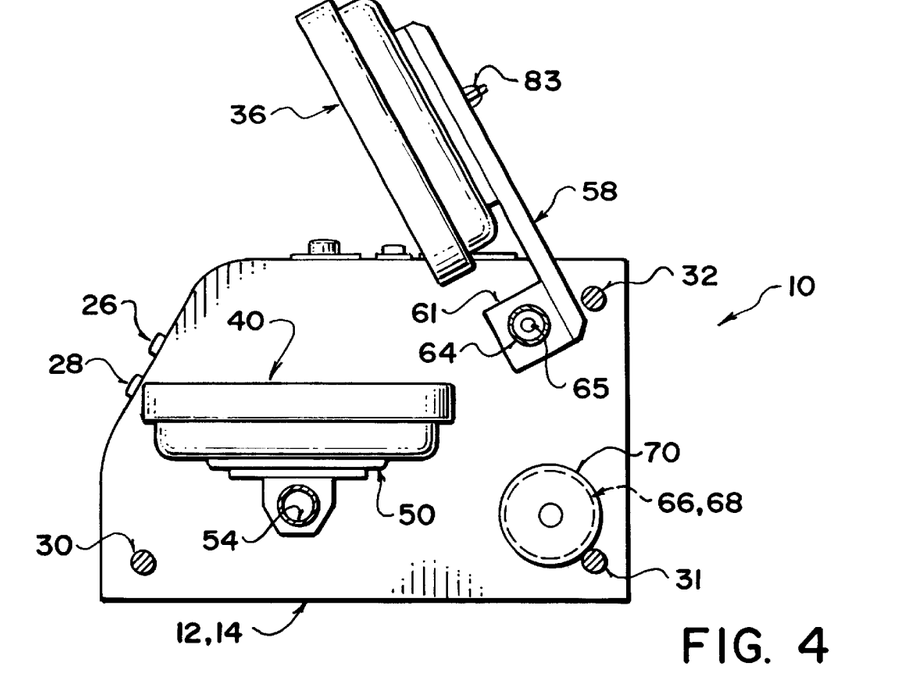
FIG. 4 is right side view of the invention, with the housing side cut away for illustration and with the griddle in the closed position.
Figure 5:
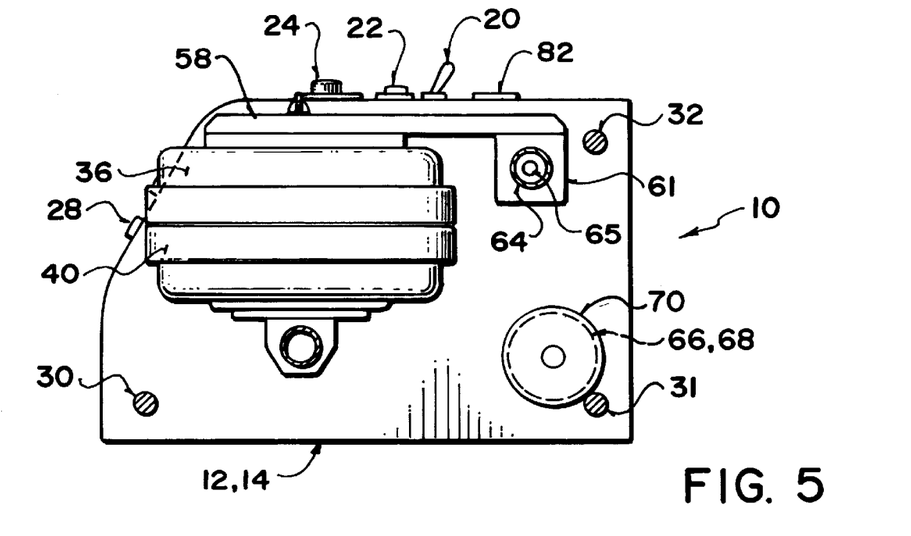
FIG. 5 is right side view of the invention, with the housing side cut away for illustration with the griddle in the closed position.
Figure 6:
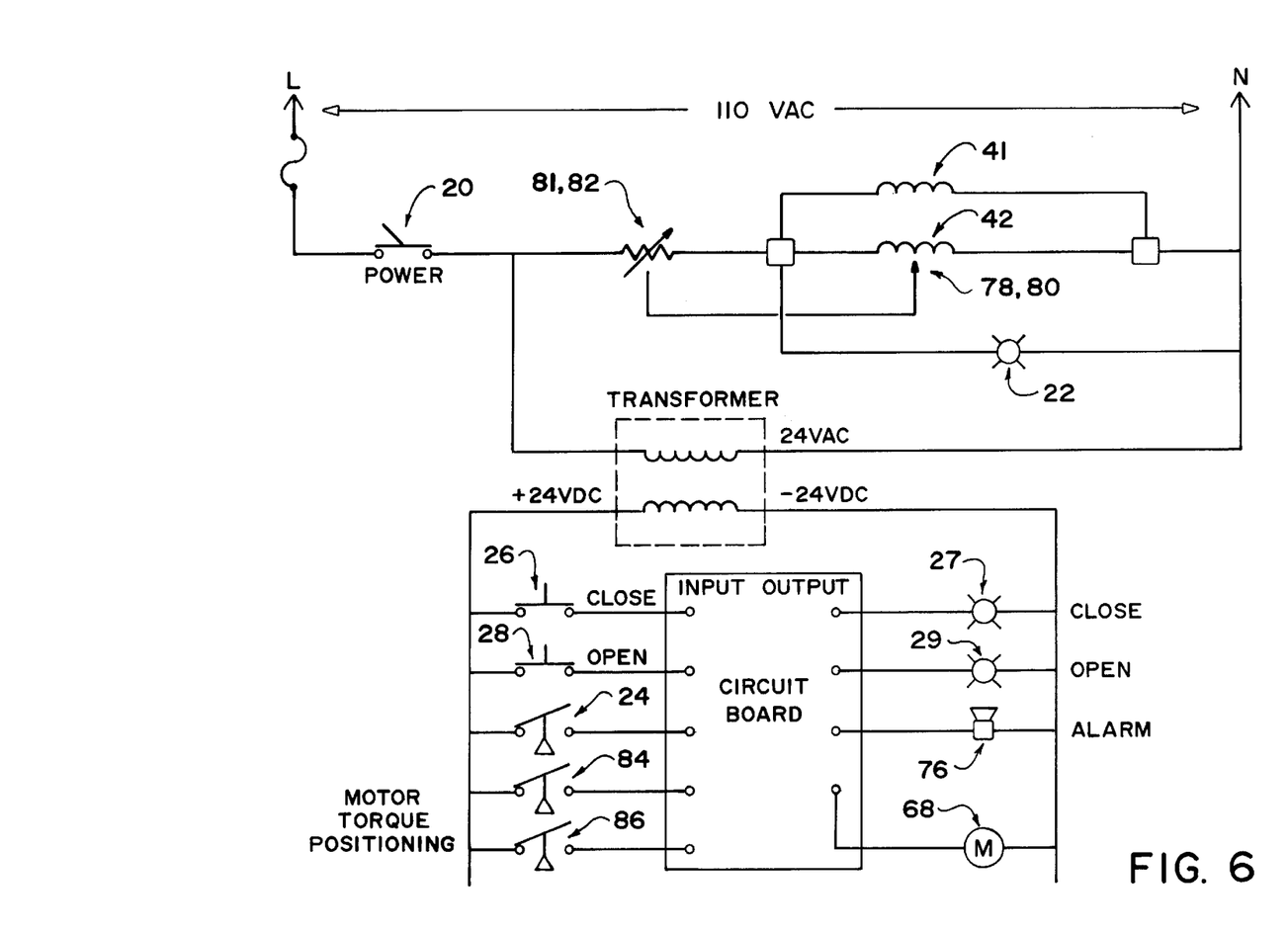
FIG. 6 is circuit diagram for the electrical circuit for one of the two griddle assemblies of the invention, both being identical.
Figure 7:
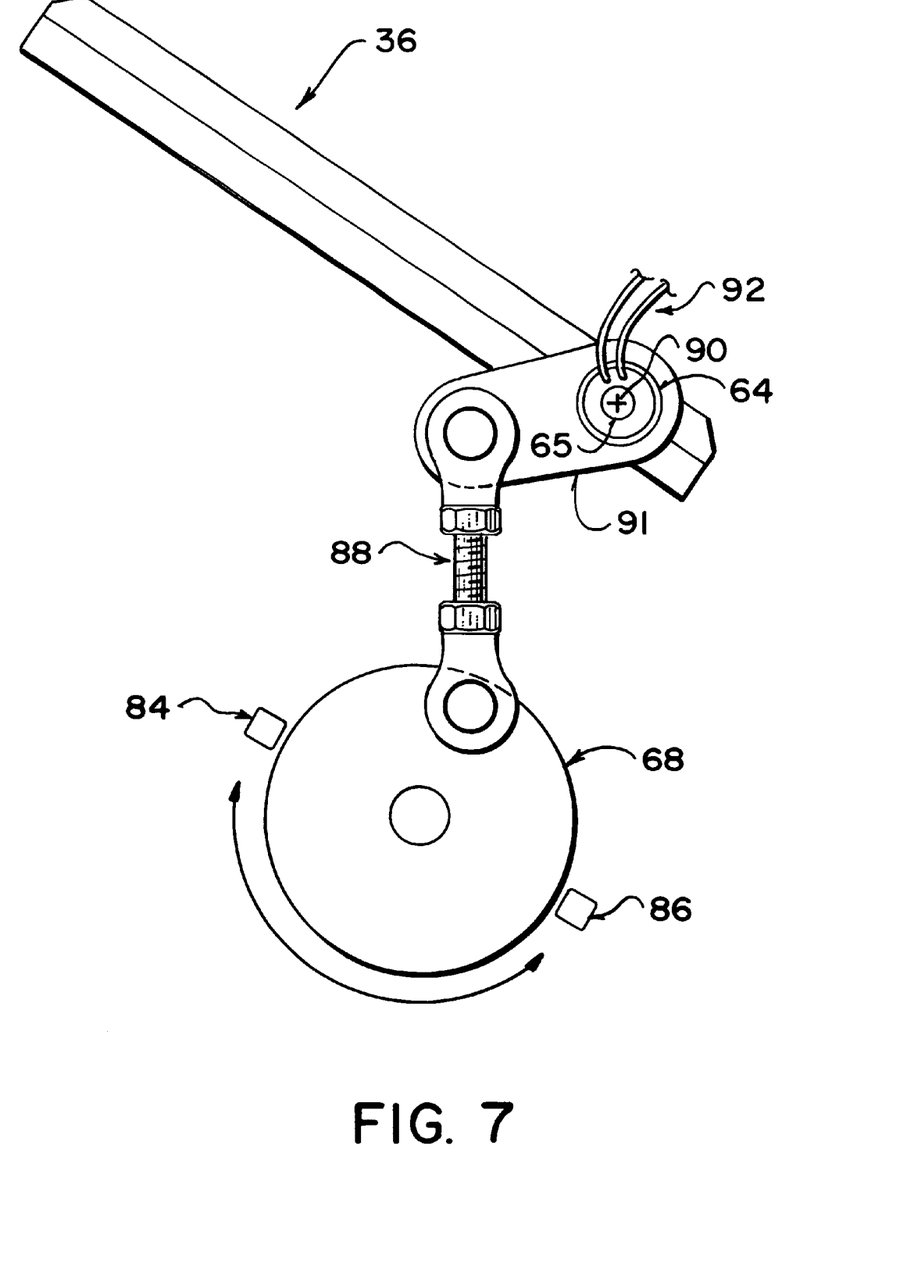
FIG. 7 is a detail of the motor drive mechanism with the top cooking plate in the open position.
Figure 8:
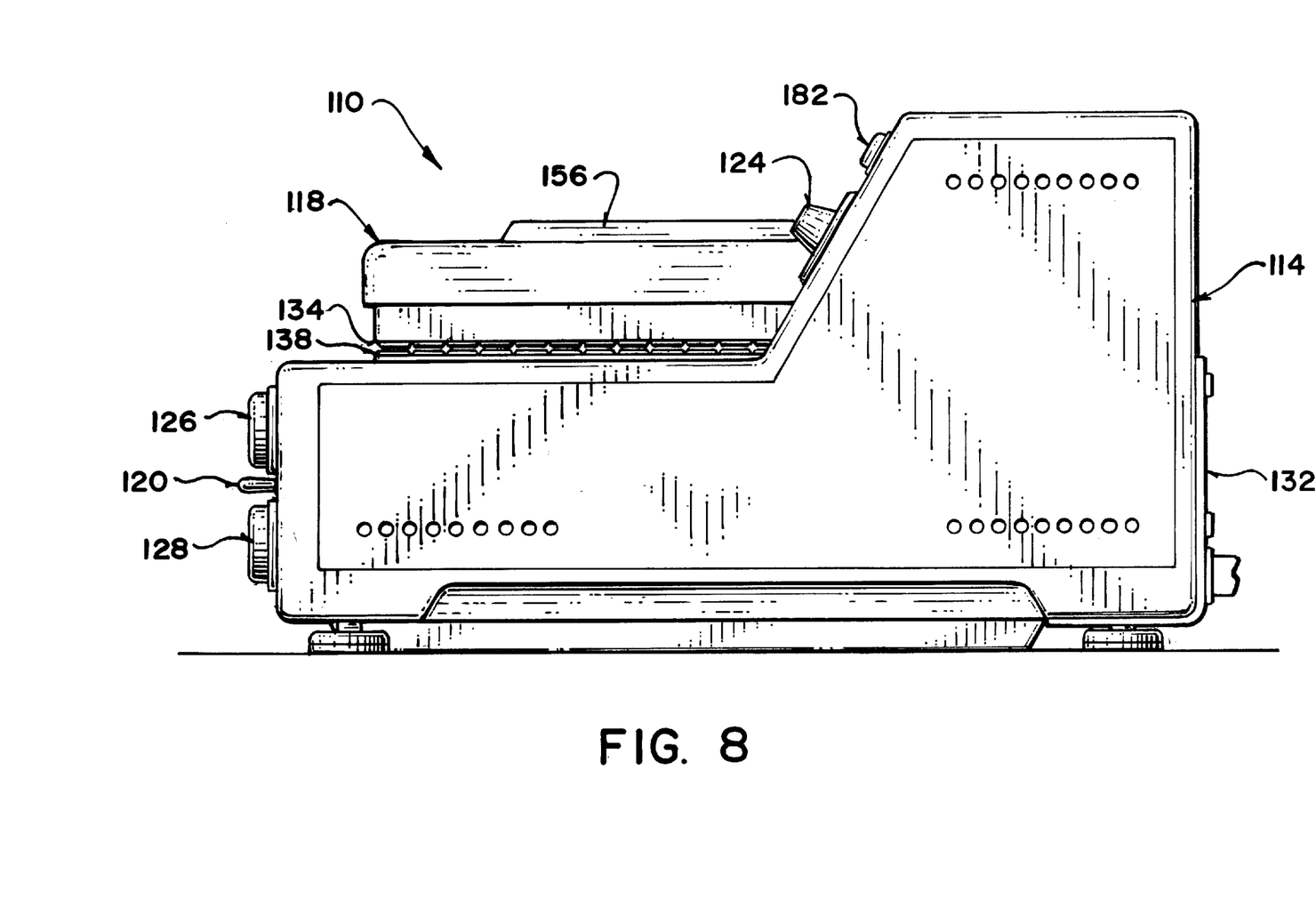
FIG. 8 is right side view of a second embodiment of the invention useful for preparing pannini sandwiches.
Figure 9:
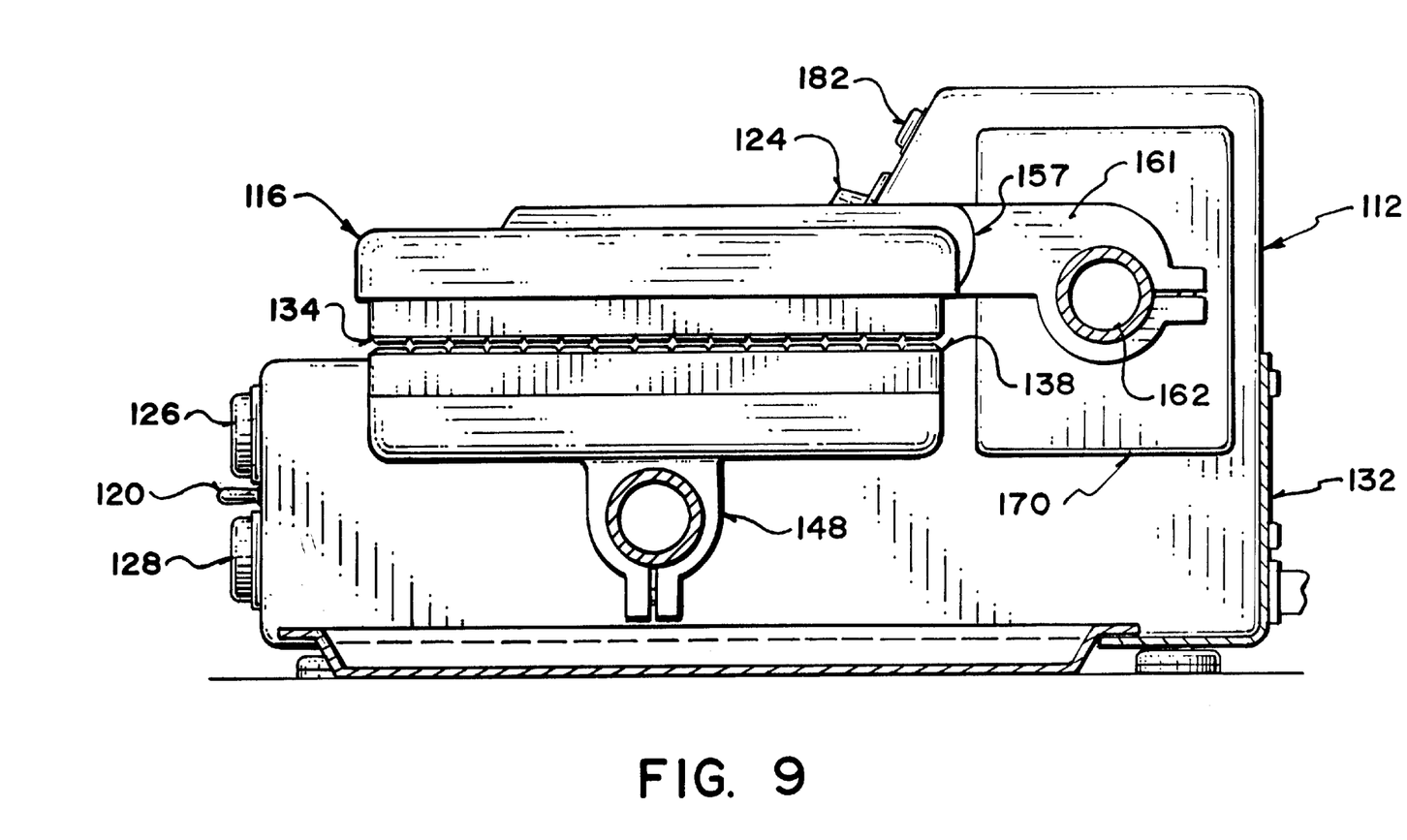
FIG. 9 is right side view of the embodiment shown in FIG. 8 with the housing side cut away for illustration and with the griddle in the closed position.

Bottom cooking plates 38, 40 are secured to pedestals 48, 50 which are in turn fixed to cross-brace 54 through which the electrical supply to heating elements 42 is provided. Top cooking plates 34, 36 are mounted on arms 56, 58 which are in turn mounted to fixed blocks 60, 61 on rotating tubes 62, 64, each of which rotates on half of a fixed shaft 65 extending between, and fixed to, housings 12, 14. An adjusting nut 83 permits the height of top cooking plates 34, 36 on arms 56, 58 to be adjusted, thereby adjusting the thickness of the cake between the top and bottom cooking plates. The ends of tubes 56, 58 extend into housings 12, 14 and are rotated by motors 66, 68 in motor housings 70, 72. Motors 66, 68 are preferably 24 volt DC miniature reciprocating motors which drive tubes 62, 64 by adjustable connecting rod 88 as shown in FIG. 7. FIG. 7 shows the top cooking plate 36 in the open position. Activation of motor 68 causes the motor to rotate clockwise until stopped by microswitch 86. Connector 61 pivots around axis 90, causing the plate 36 to close. To open, motor 68 rotates counterclockwise until stopped by microswitch 84. Wires 92 providing power to the heating element extend through axis 90. Two beeper alarms 74, 76 are provided to signal when cooking on either side is complete. Thermocouple temperature sensors 78, 80 associated with each bottom cooking plate 38, 40 sense the temperature of the lower cooking plates and turn the heating elements on or off when the temperature of the lower cooking plate decreases or increases beyond a pre-set limit set on temperature controls 81, 82. Alternatively the temperature control can be fixed internally by the thermocouple with a fixed minimum and maximum temperature.

In operation, the desired temperature is set on the temperature controls panels 81, 82 and the timer knobs 24 are set to the desired time for each griddle for optimum cooking operation. Initially, both upper cooking plates are in the raised, open position. The machine on/off switch 20 is turned "on", causing the indicator 22 to illuminate and heating elements to heat top and bottom cooking elements 36, 38, 40, 42. After allowing the elements to heat up, the attendant pours the waffle cone batter onto one or both of the lower cooking plates 38, 40 and presses the top cooking plate close button 24 and/or 26 associated with the bottom cooking plate on which the batter has been poured, illuminating a green indicator light causing the motor to close the top cooking plate until one of microswitches 84 causes the motor to stop the cooking plate in the proper closed position, and causing the timer for that griddle to start. Once the time set on either of the timers expires, alarm beeper 76 or 78 for that timer sounds, and the motor associated with that timer is activated to open the top cooking plate until one of microswitches 86 causes the motor to stop the cooking plate in the proper open position. The cooked cone cake remains heated on the heated bottom cooking plate until the attendant removes it, or turns off the machine on/off switch. The cake is kept warm but not overcooked due to the temperature control and the fact that the top cooking plate is open. If the attendant needs to open the top cooking plate before the timer has opened it, the attendant presses the cooking plate manual open button 28 which activates motor 68 to open the top cooking plate.

In this way the cake for the waffle cone is automatically cooked to the desired degree and is kept warm and flexible until the attendant is free to remove it and form it into a cone.

Figure 10:
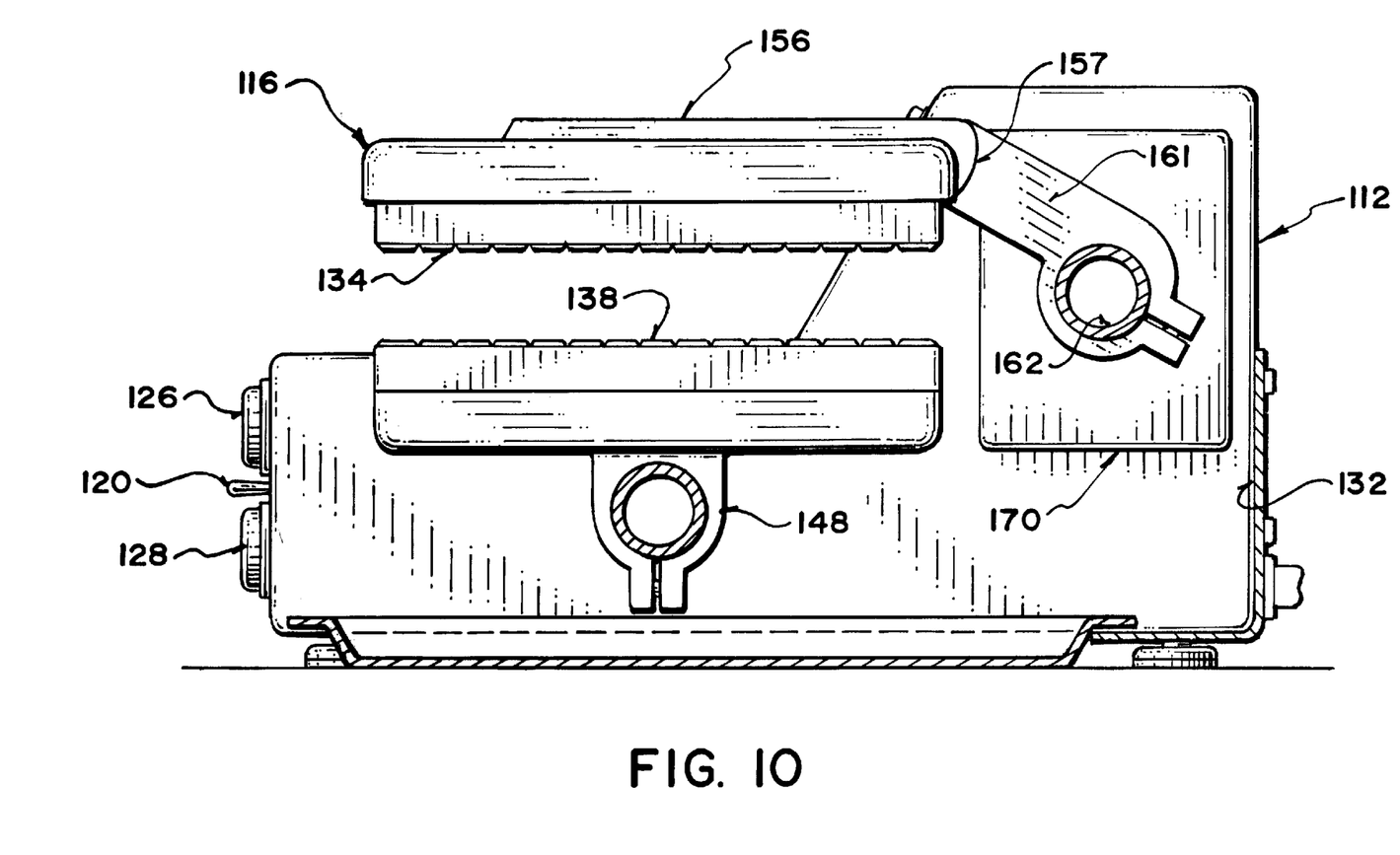
FIG. 10 is right side view of the embodiment shown in FIG. 8 with the housing side cut away for illustration and with the griddle in the open position.
Figure 11:
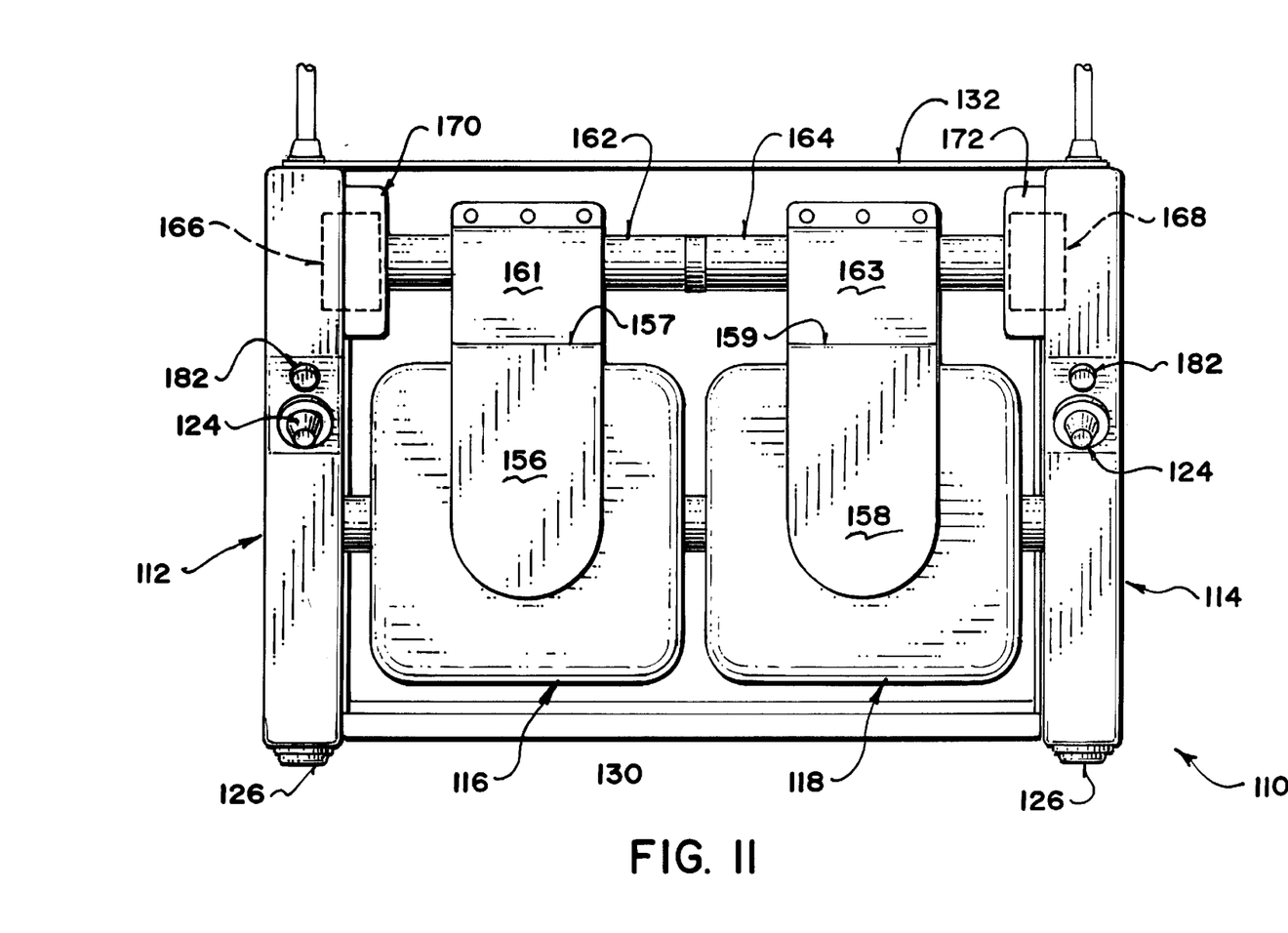
FIG. 11 is top view of the embodiment shown in FIG. 8.

An embodiment of the invention which is useful for baking pannini sandwiches is shown in FIGS. 8 through 11, designated by reference numeral 110. It comprises left and right griddle assemblies 116, 118 mounted between left and right housings 112, 114. Left and right griddle assemblies 116, 118 each comprise top cooking plates 134 and bottom cooking plates 138. Each cooking plate is again TEFLON™ coated cast iron provided with top and bottom electric heating elements as in the embodiment described above. In this embodiment an upstanding rim is not required to retain batter, nor grooves to provide a surface pattern. Each housing 112, 114 has a griddle on/off switch 120, timer knob 124, temperature control 182, top cooking plate close button 126 and top cooking plate manual open button 128. Right and left housings 12, 14 are joined by cross-members 130, 132. Bottom cooking plates 138 are mounted on a gimballed support 148 which allows cooking plates 138 to tilt forward or rearward but is biassed to return to a horizontal position. Top griddle assembles 116, 118 are mounted on arms 156, 158 which are in turn are pivotally secured through joints 157, 158 to arms 161, 163 independently rotating axles 162, 164, each of which rotates is controlled by a micro-electric motor 166, 168 in motor housings 170, 172 and which are controlled to stop rotation of the axles 162, and 164 at predetermined angles and are also connected to pressure sensors (not shown) to stop the motor when pressure on the motors exceeds a certain level. FIG. 10 shows the top cooking plate 134 in the open position. Activation of motor 166 causes the motor to rotate clockwise until stopped by the pressure sensor when cooking plate 134 is in contact with the top of a pannini sandwich. Cooking plates 134, 138 are able to pivot to keep their surface in contact with the surfaces of parallel or uneven sandwiches. As in the first embodiment, beeper alarms are provided to signal when cooking is complete. As before, thermocouple temperature sensors associated with each bottom cooking plate sense the temperature of the bottom cooking plates and turn the heating elements on or off when the temperature of the lower cooking plate decreases or increases beyond a pre-set limit set on temperature controls 182.

In operation of the second embodiment, the desired temperature is set on the temperature controls 182 and the timer knobs 124 are set to the desired time for each griddle for optimum cooking operation. Initially, both upper cooking plates are in the raised, open position. The machine on/off switch 120 is turned "on", causing the heating elements to heat top and bottom cooking elements. After allowing the elements to heat up, the attendant places the pannini sandwich onto one or both of the lower cooking plates 138 and presses the top cooking plate close button 126 associated with the bottom cooking plate on which the sandwich has been placed, causing the motor to close the top cooking plate until a pressure sensor causes the motor to stop the cooking plate in the proper closed position, and causing the timer for that cooking plate to start. Once the time set on either of the timers expires, an alarm beeper for that timer sounds, and the motor associated with that timer is activated to open the top cooking plate. The sandwich remains heated on the heated bottom cooking plate until the attendant removes it, or turns off the machine on/off switch. The sandwich again is kept warm but not overcooked due to the temperature control and the fact that the top cooking plate is open. If the attendant needs to open the top cooking plate before the timer has opened it, the attendant presses the cooking plate manual open button 128 which activates the associated motor to open the top cooking plate. In this way the pannini sandwich is automatically cooked to the desired degree and is kept warm without burning until the attendant is free to remove it.

Figure 12:
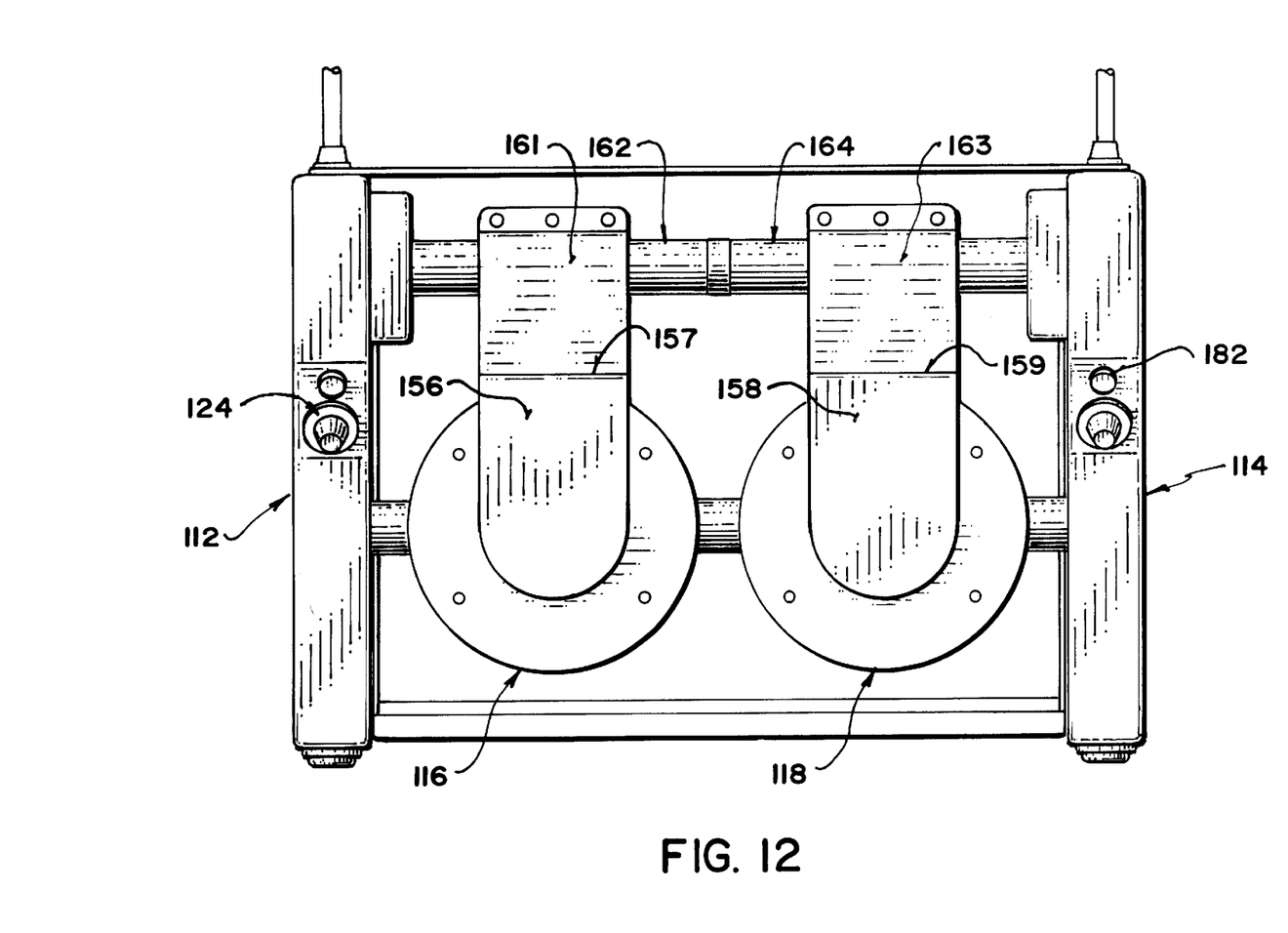
FIG. 12 is top view of a further embodiment of the invention.

As will be apparent to those skilled in the art in the light of the foregoing disclosure, many alterations and modifications are possible in the practice of this invention without departing from the spirit or scope thereof. For example, the shape of the griddle assemblies 116, 118 may be varied according to the preferred food item. FIG. 12 shows a circular shape which may be preferred for cones or round sandwiches. The machine may also be constructed with a combination of griddle types and shapes. For example instead of having two griddles of the same type, one griddle may be a waffle cone griddle and the other a pannini sandwich griddle. Accordingly, the scope of the invention is to be construed in accordance with the substance defined by the following claims.

What is claimed is:

1. An apparatus for baking food items such as sandwiches comprising:
    a) a lower cooking plate provided with a first electric heating element;
    b) an upper cooking plate provided with a second electric heating element and pivotable between a first open position spaced from said lower cooking plate and a second baking position proximate to said lower cooking plate;
    c) motor means for pivoting said upper cooking plate between said first and second positions;
    d) first switch means for activating said motor means to lower said upper cooking plate to said second position;
    e) timing means for activating said motor means to raise said upper cooking plate to said first position after a pre-determined period of time; and
    f) temperature control means for sensing the temperature of said lower cooking plate and providing electric power from a supply of electric power to said first and second heating elements when said lower cooking plate is below a predetermined temperature and ceasing to provide electric power when said lower cooking plate is above a predetermined temperature; and
    g) pressure sensing means associated with said motor means adapted to stop said motor means when said upper cooking plate encounters resistance above a pre-set limit.

2. The baking apparatus of claim 1 wherein said upper cooking plate is mounted by a pivotable connection to a pivotable arm, said pivotable arm being pivotted by said motor means.

3. The baking apparatus of claim 2 wherein said lower cooking plate is mounted on a gimballed support.

4. The baking apparatus of claim 2 wherein said lower cooking plate is pivotably mounted.

5. The baking apparatus of claim 1 wherein said lower cooking plate is mounted on a gimballed support.

6. The baking apparatus of claim 1 wherein said lower cooking plate is pivotably mounted.

7. The baking apparatus of claim 1 further comprising second switch means for selectively opening or closing a circuit for providing power to said heating elements and motor means.

8. The baking apparatus of claim 1 further comprising third switch means for selectively activating said motor means to raise said upper cooking plate to said first position.

9. The baking apparatus of claim 1 further comprising fourth and fifth switching means for stopping said motor means when said upper cooking plate has reached said first or second positions respectively.

10. The baking apparatus of claim 1 further comprising alarm means for emitting a signal when said timing means activates said motor means.

11. The baking apparatus of claim 1 wherein said motor means drives a chain connected to a tube by pulley means, and said upper cooling plate is secured to said tube.

12. The baking apparatus of claim 1 wherein said upper and lower cooking plates are pivotable about a horizontal axis.

13. An apparatus for baking food items such as sandwiches comprising a plurality of baking apparatus as claimed in claim 1.

14. The apparatus of claim 13 further comprising a fixed axle and wherein said upper cooking plates of said baking apparatus of claim 12 are pivotally mounted respectively on two linearly aligned coaxial tubes each pivotally supported on said axle.

15. The apparatus of claim 14 comprising left and right housings, and wherein said axle extends between said left and right housings.

16. The apparatus of claim 13 wherein each of said upper cooking plates is mounted by a pivotable connection to a pivotable arm, said pivotable arm being pivotted by said motor means.

17. The apparatus of claim 13 wherein each of said lower cooking plates is mounted on a gimballed support.

18. The apparatus of claim 13 wherein each of said lower cooking plates is pivotably mounted.

19. The apparatus of claim 16 wherein each of said lower cooking plates is mounted on a gimballed support.

20. The apparatus of claim 16 wherein each of said lower cooking plates is pivotably mounted.

* * * * *